Patented Aug. 22, 1939

2,170,336

UNITED STATES PATENT OFFICE 2,170,336

TREATMENT OF HYDROCARBON OILS

Jacque C. Morrell, Chicago, Ill., assignor to Universal Oil Products Company, Chicago, Ill., a corporation of Delaware No Drawing. Application July 8, 1935, Serial No. 30,332

4 Claims. (Cl. 196—36)

This invention refers more particularly to the treatment of relatively low boiling gasoline fractions produced in the cracking of heavy petroleum oils though similar motor fuel mixtures produced from the primary distillation of crude petroleums or from other sources may also be treated. This application is a continuation-in-part of my prior application Ser. No. 631,173, filed August 31, 1932.

More specifically the invention has reference to a process for producing substantially finished or refined gasolines by the treatment of such hydrocarbon oil mixtures in heated vaporous condition by means and by a method adapted to suitably refine them, so that the need for liquid phase treatment followed by rerunning as currently practiced is unnecessary and the cost of gasoline production is decreased.

To enable treatment of vapors with sulfuric acid, use may be made of solutions of various soluble materials of low volatility in sulfuric acid, which materials partly take the place of water as a diluent and allow the maintenance of fixed low concentrations of sulfuric acid in such treatments on account of their lower vapor pressure and in consequence the boiling point as well as the concentration of the sulfuric acid may be controlled.

In one specific embodiment the invention comprises the treatment of hydrocarbon oils, particularly cracked hydrocarbon oil distillates, in heated vaporous condition with reagent solutions containing sulfuric acid and various organic compounds of low volatility, the treatment being conducted under pressures less than atmospheric. The low pressure reduces undesirable decomposition effects.

The materials of low volatility which may be used in solution with sulfuric acid according to the process of the invention comprise several classes of materials which may be used alternatively though they are not equivalents in regard to the character of the solutions or in the effects produced by their use.

According to the present invention more or less stable organic compounds are employed as spacing agents or diluents in admixture with sulfuric acid, these compounds generally replacing water and enabling in effect a control of the concentration of the acid which is employed so that overtreatment with resulting oxidation and the formation of undesirable by-products is substantially avoided. As will be presently disclosed, some of the organic compounds may interact with the acid to a varying extent, thus further modifying its action upon the oil vapors that are undergoing treatment, and some of the organic substances and their sulfo derivatives may exert some idependent and separate refining action. The principal criterion of an organic spacing agent to be used with a sulfuric acid in treatments of the present character is that it does not tend to char or carbonize in the presence of the acid under the treating conditions necessary for most favorable treating action.

The most important and most generally utilizable classes of organic compounds in the present connection are certain organic acids and bases. As examples of organic acids which may be employed may be mentioned such acids as benzene sulphonic acid, acetic acid, chlor-acetic acids, other aliphatic carboxylic acids such as propionic, butyric, hexoic, isobutylacetic, dimethyl ethyl acetic, heptoic, et cetera. Dicarboxylic acids such as oxalic, succinic, tartaric, maleic, etc., can seldom be used owing to the decomposing effect of hot sulfuric acid upon them to produce water and oxides of carbon. However, the carboxylic acids of aromatic or hydroaromatic groups are readily utilizable, such acids including benzoic acid, the toluic and xylidic acids as well as phthalic, isophthalic and terephthalic acids. In the majority of instances such aromatic spacing agents will be partially sulphonated in the course of the treatment.

As examples of organic bases whose sulphuric acid salts may be used along with sulfuric acid in treatments characteristic of the process are such substances as amines, imines, pyridines, picolines, lutidines, collidines, et cetera. Of the amines, aniline is a good example, this substance yielding under certain conditions of treatment sulphanilic and metanilic acids which act as the diluting or spacing materials. Pyridine and its homologs may also undergo a certain degree of sulfonation, depending upon the strength of the sulfuric acid employed and the operating conditions of temperature and pressure. It is generally preferred to use organic bases of ring structure, as the object of the invention is to selectively remove more highly unsaturated olefin compounds from cracked vapors and to some extent the sulfur compounds. It has been found that, when the acid is diluted with alkyl derivatives of sulfuric acid such as ethyl sulfuric acid, dimethyl sulfate, et cetera, the reactivity of the solution may be lessened to an undesirable degree.

The process may be conducted in any suitable type of equipment since those skilled in the art of refining petroleum are familiar with contacting and fractionating columns and methods of maintaining vacuum thereon, the means for this end including pumps for the distribution of products accumulating in receivers to step them up to atmospheric pressure. In applying the sulfuric acid treating reagents to vapors under vacuum they may be introduced into filled or unfilled chambers in an atomized state to descend counterflow to ascending streams of vapors or they may be introduced into fractionating columns containing bubble trays to flow downwardly in a more or less continuous stream. An extremely simple alternative method consists in drawing the vapors upwardly through stationary pools of treating raagents. Also, the vapors may be quickly contacted with the sulfuric acid reagent and the reaction products resulting therefrom quickly separated. Following the treatment of the vapors the overhead may be condensed (with extra cooling below atmospheric if such seems necessary for best results) and the condensed liquids passed to a receiver from which they are withdrawn by suction pumps and discharged to storage. The vapors from the receiver which may contain additional quantities of gasoline boiling range hydrocarbons may be passed to auxiliary towers for recovery of light vapors either by absorption or by compression and cooling as may be the most feasible under any given circumstances. Partially spent treating reagents may be circulated continuously until their maximum treating effect is obtained and as in processes operating at atmospheric or superatmospheric pressure using the same treating reagents the sludges may be subjected to any type of regeneration steps and returned for further use in lieu of fresh materials.

It is to be particularly noted, in accordance with the process of the present invention, that treatments may be effected using relatively stronger treating solutions and in fact sulfuric acid containing only minor amounts of water or diluent solutes may be employed in many instances so that results more nearly approach those obtained in ordinary liquid phase operations as regard the extent of the action of the acid. However, the invention is not confined to the use of such relatively strong acid solutions but preferably employs rather high concentrations of dissolved spacing materials and minor amounts of sulfuric acid for controllably treating vapor mixtures whose gum and sulfur content are relatively low, so that little refining is necessary. In any event the degree of sub-atmospheric pressure and the proportions of sulfuric acid, non-volatile spacing agent and solvent (usually water) as well as time and degree of contact may be varied to suit the demands of any particular situation.

The temperature of treatment actually employed will be contingent upon a large number of factors such as the character of the vapors in regard to their content of unsaturates and sulfur compounds and the type of treating solution which it is preferred to use, for example, from a cost standpoint. Since the employment of excessively low absolute pressures such as those below a fraction of an inch of mercury is attended with great loss of volumetric capacity in the treater, it is generally not preferable to use absolute pressures much lower than one inch of mercury even though very low temperatures may be made available in this way. A consideration of characteristic temperature-pressure curves for hydrocarbon oil vapors will show that, by reducing the pressure from thirty to one inch of mercury absolute, a reduction of temperature of approximately 200° F. may be effected. The advantage of the invention becomes still more obvious when it is considered that vapors of approximately gasoline boiling point range issuing from the pressure fractionator of a cracking process may be at temperatures as high as 500 to 600° F. under 200 to 300 pounds per square inch pressure and that reduction in temperature by reducing the pressure may be accomplished so that vapors may be treated at temperatures within the range of 175 to 275° F., without great difficulty, these temperatures being suitable when treating with sulfuric acid organic compound solutions of high treating efficiency.

While in many instances the application of the process of the invention for treatment of particular vapor mixtures may be sufficient to produce a gasoline having characteristics meeting all commercial requirements, it is still comprised within the scope of the invention to utilize the process in conjunction with other treating steps either in vapor or liquid phase if such be required. For example, the vapors still under vacuum may be passed through and receive further neutralizing or sweetening treatment, or the condensed liquid may be neutralized and washed and in general refined to the desired degree by whatever type of treatment may be necessary. The use of settling and mechanical filtering devices to rid the vapors of suspended mist or entrained solids is obviously comprised within the scope of the operations, such means being used at the discretion of the operator when necessary.

A particular feature of the invention resides in the fact that undesirable constituents such as di- and tri-olefins and sulfur compounds may be removed more selectively from vapors both on account of the lowered temperatures used and on account of the moderation of the action of the sulfuric acid owing to its dilution. Thus, the gum-forming and corrosive constituents are controllably removable from cracked hydrocarbon vapors without any material effect upon the mono olefins which are thus retained to add to the knock rating of the finished gasoline produced as an end product of the process. Furthermore, due again to the low temperatures and selective action of the treating agents, oxidation reactions of the sulfuric acid are reduced to a minimum so that the treating reagent is conserved, the formation of sulfoxy compounds is reduced and the sludges are more easily regenerated.

The following examples are given to illustrate the general character of the results made possible by the present process though they are not intended to limit the scope of the invention.

As one example, the vapors from the fractionator of a cracking process operating upon heavy gas oil fractions from Mid-Continent crudes may be treated. The reagent solution employed may consist approximately of 60% sulfuric acid, 30% chloracetic acid and 10% of water by weight, the net amount used per barrel of finished gasoline being approximately 6 pounds per barrel with proper recirculation. By maintaining a vacuum on the treater of approximately 3 to 5 pounds, absolute pressure, these vapors may be treated at a temperature of approximately 200° F., the improvement in the gasoline accomplished by this treatment may be seen from a comparison of the figures in the following tabulation, column 1 headed "Raw gasoline" referring to that produced by simple fractionation and column 2 headed "Treated gasoline" referring to that produced after the vapor phase treatment described:

|  | Raw gasoline | Treated gasoline |
|---|---|---|
| Gravity °A. P. I. | 54.2 | 54.8 |
| Color, Saybolt | 14 | +30 |
| Color after 4 hours exposure to sunlight | Yellow | 26 |
| End boiling point | 415 | 410 |
| Mg. gum by copper dish method | 265 | 10 |
| Total sulfur, percent | 0.38 | 0.12 |
| Octane number | 76 | 75 |

As another example, the gasoline from a cracking process conducted upon California charging stock may be taken for consideration. In this case the treating solution may consist of 60% sulfuric acid, 30% sulfanilic acid and 10% water, this mixture being used at the rate of 7 to 8 pounds of finished product. By utilizing a vacuum corresponding to an absolute pressure of approximately 4 pounds per square inch on the treater, a temperature of treatment corresponding to 180° F. may be employed, the comparative properties of the raw and treated gasolines being again shown in tabular form as follows:

|  | Raw gasoline | Treated gasoline |
|---|---|---|
| Gravity °A. P. I. | 53.0 | 53.5 |
| Color, Saybolt | 10 | 30 |
| Color after 4 hours exposure to sunlight | Yellow | 24 |
| End boiling point | 410 | 414 |
| Mg. gum by copper dish method | 470 | 25 |
| Total sulfur, percent | 0.46 | 0.22 |
| Octane number | 83 | 82 |

The foregoing description of the invention and the illustrative examples of results given have served to define its character and make its value readily apparent but the exact details of description and the numerical results given are not to be construed as imposing undue limitation upon the generally broad scope of the invention.

I claim as my invention:

1. A process for the treatment of cracked hydrocarbon oil distillate which comprises subjecting said cracked hydrocarbon oil distillate while in heated vaporous condition to the action of sulphuric acid containing a monocarboxy organic acid of relatively low volatility at a pressure less than atmospheric.

2. A process for the treatment of cracked hydrocarbon oil distillate which comprises subjecting said cracked hydrocarbon oil distillate while in heated vaporous condition to the action of sulphuric acid containing an organic compound comprising essentially an acetic acid of relatively low volatility at a pressure less than atmospheric.

3. A process for the treatment of cracked hydrocarbon oil distillate which comprises subjecting said cracked hydrocarbon oil distillate while in heated vaporous condition to the action of sulphuric acid containing an organic compound comprising essentially a homolog of acetic acid of relatively low volatility at a pressure less than atmospheric.

4. A process for the treatment of cracked hydrocarbon oil distillate which comprises subjecting said cracked hydrocarbon oil distillate while in heated vaporous condition to the action of sulphuric acid containing an organic compound comprising essentially a monocarboxy fatty acid of relatively low volatility at a pressure less than atmospheric.

JACQUE C. MORRELL.